Figure 1:
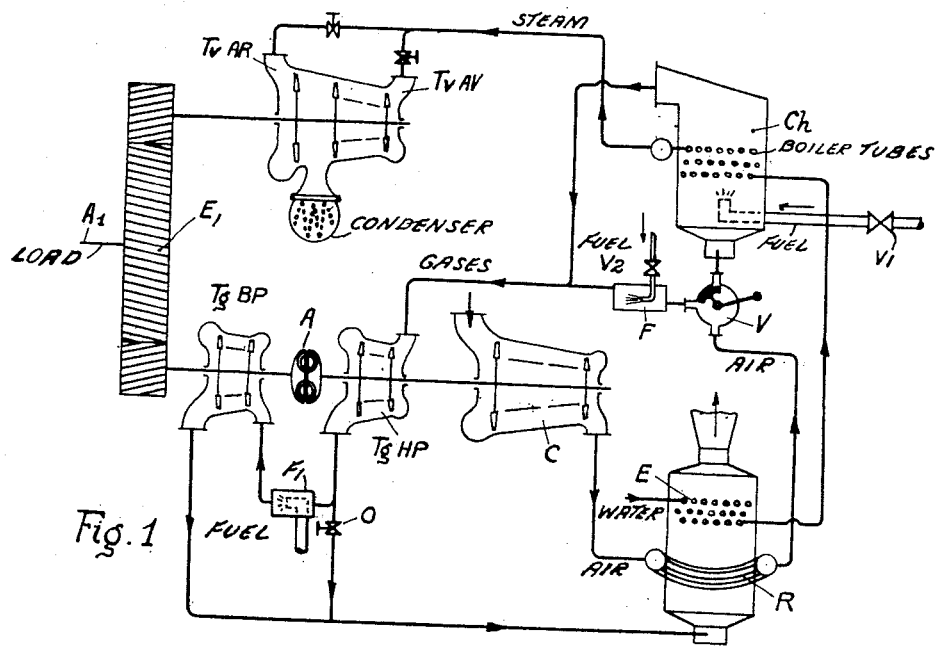

Dec. 22, 1953

R. F. M. WAESELYNCK 2,663,145

POWER PLANT COMPRISING THE COMBINATION OF GAS
AND STEAM TURBINES WITH A SUPERCHARGED
FURNACE STEAM-GENERATOR

Filed Sept. 26, 1949

2 Sheets-Sheet 1

INVENTOR
R. F. M. Waeselynck
By Watson, Cole, Grindle & Watson

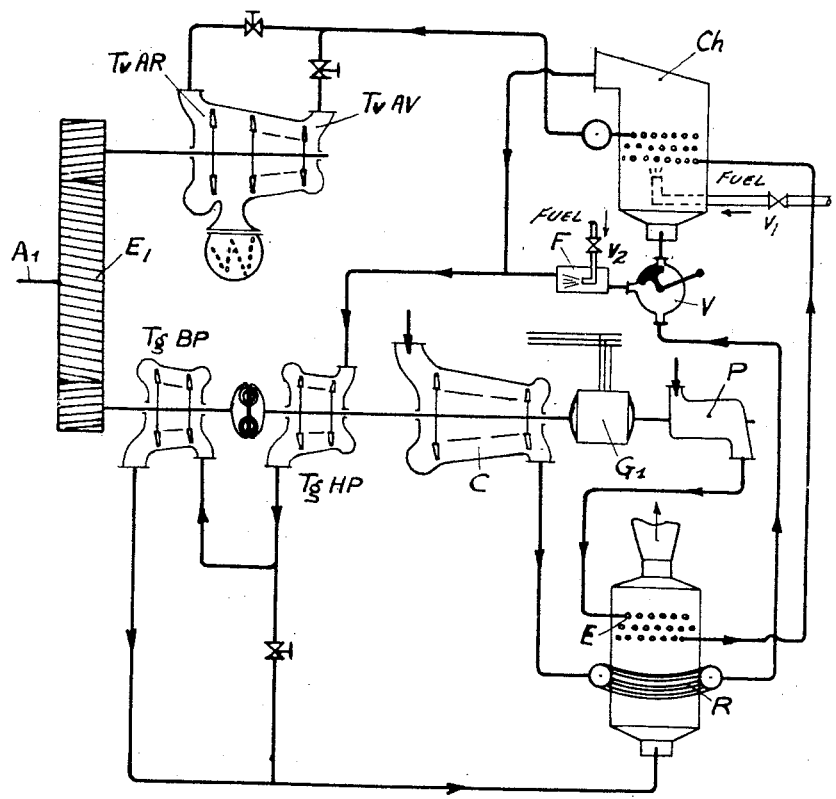
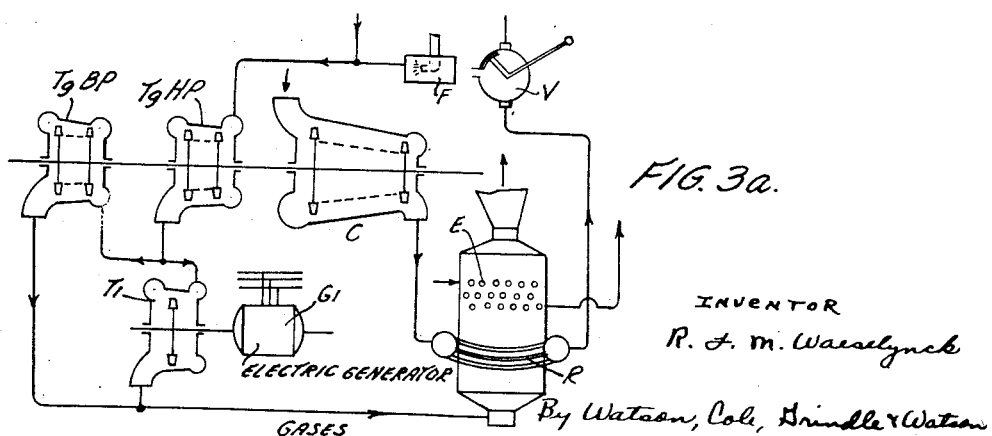

Patented Dec. 22, 1953

2,663,145

UNITED STATES PATENT OFFICE 2,663,145

POWER PLANT COMPRISING THE COMBINATION OF GAS AND STEAM TURBINES WITH A SUPERCHARGED FURNACE STEAM-GENERATOR

Raymond F. M. Waeselynck, Indret, Loire-Inferieure, France, assignor to Societe Rateau (Societe Anonyme), Paris, France, a company of France, and Rene Anxionnaz, Paris, France Application September 26, 1949, Serial No. 117,746
Claims priority, application France
October 6, 1948

3 Claims. (Cl. 60—39.18)

Numerous power plants are known which comprise combinations of gas turbines and steam turbines whose steam-generators use the lost heat of the gas cycle, or conversely plants in which gas turbines use the lost heat of boilers of the steam cycle. Steam-generators are also known whose furnaces are supercharged and in which the turbo-compressor only plays the part of an auxiliary designed to raise the level of pressures and the velocities of combustion gases, without however altering the efficiency or the power of the plant.

The present invention has for its object a combined gas and steam power unit comprising particular arrangements which facilitate the distribution of the loads between the turbines supplying the effective power and the achievement of a sustained efficiency between full and reduced loads. In the gas cycle, the motive fluid operates along an open circuit according to a cycle whose extreme temperatures are in a high ratio to one another, whereas the extreme pressures remain in a moderate ratio. Conversely, steam operates along a closed cycle whose extreme temperatures are in a moderate ratio to one another and whose extreme pressures are in a high ratio. The highest temperature of the first cycle may reach the theoretical value corresponding to a complete combustion, the lowest being, for instance, ambient temperature. The steam cycle whose heat exchanges with the gas cycle may occur both upstream and downstream relative to the gas turbine, absorbs almost the whole heat which the gas cycle has not been able to convert directly into work, owing to the too high or too low temperature of the operative gas and proceeds with the conversion of this heat into mechanical energy by expanding down to low pressures.

According to the invention, the furnace of a steam-generator, of the supercharged type, is arranged upstream with respect to the gas turbines and on a by-pass with respect to the circuit of air discharged by the compressor, so that the power of the steam cycle which is additional to the power of the gas cycle, may be adjusted according to need, by opening more or less the by-pass.

Other objects and advantages of the invention will be apparent during the course of the following description.

In the accompanying drawing forming a part of this application and in which like numerals are employed to designate like parts throughout the same, Figures 1, 2, 3 and 3a are diagrammatic representations of four embodiments of the invention.

The device shown in Fig. 1 comprises, on the one hand, an ordinary gas turbine unit having an air compressor C driven by a gas turbine (the latter has been represented by two units $Tg$ HP and $Tg$ BP arranged in series, the shafts of both turbines being connected to one another through a fluid coupling A), a furnace F or combustion chamber inside which a liquid fuel, for instance, is burnt, an air-heater R at the exhaust of the gases, and, on the other hand, a steam plant whose boiler $Ch$ having its own furnace, is arranged on the path of the gases, in parallel with the combustion chamber F. By means of a gate-valve V, it is possible to vary at will from 0 to 100% the streams of compressed and heated air directed respectively towards the furnace of the boiler $Ch$ and towards the independent furnace F. The flue gases mix at the outlet of the furnace F and of the boiler $Ch$, then expand inside the gas turbine and flow through the air-heater R from which they escape into the atmosphere. In the steam cycle, the turbine $Tv$ AV and $Tv$ AR are not provided with any steam bleed water-heater, but the vaporization tubes are preceded by an economiser E which completes the exhaustion of the heat of the flue gas flowing out of the air-heater R, for heating the feed-water.

Owing to the by-pass arrangement of the furnace $Ch$ of the steam-generator on the air circuit, to the adjusting device V enabling to adjust the ratios of the air flows directed respectively towards the furnace $Ch$ of the generator and towards the external independent furnace F, and lastly to this furnace F inside which an amount of fuel adjustable in terms of the air circulating through it, may be burnt, it is possible to adjust independently from one another the motive powers of the gas cycle and of the steam cycle, i. e. the output of the air-compressor C and the generation of steam. In particular, it is possible to vary over a wide range, beyond the ratio 8:1, the effective power of the combined unit, without altering the rate of the air-compressor C, with the advantage both of keeping the optimum adaptation conditions of the gas turbine-compressor unit and of avoiding the troublesome influence of the inertia of this unit on the keeping of a correct air-fuel ratio in the furnace $Ch$ of the steam-generator when the latter has a rapidly varying output.

The device of Fig. 1 is not limitative and the combination of gas and steam turbines is liable to have various applications. In the example of the drawing, the gas turbine is divided into two units, a high pressure one $Tg$ HP driving the compressor C at a velocity which varies slightly, the low pressure turbine $Tg$ BP transmitting, in cooperation with the steam turbine, the effective power to a driven shaft $A_1$ through a gear-train $E_1$ for instance.

It is possible to improve the efficiency of this gas turbine set by providing for an additional heating of gases, for instance between the units $Tg$ HP and $Tg$ BP of the turbine as shown at $F_1$ in Fig. 1.

The power of a steam turbine being usually much greater than that of a gas turbine, a wide range of rate variations, down to the minimum corresponding to the effective power of the gas turbine, is obtained merely by acting on the gate-valve or throttle V of the steam unit, without altering the rate of the compressor as long as the output of the latter is just sufficient for the complete combustion of the whole fuel inside the furnace $Ch$ of the steam-generator.

The air and fuel admissions into the boiler must be adapted to the production of steam by acting on valves V and $V_1$; the remainder of the air flows through the independent furnace F the fuel supply of which is adjusted by acting on valve $V_2$ so as to keep constant the rate of the compressor or to vary it in accordance with the total power required. But a modification of the rate of the compressor is only necessary when changing from average powers to small or high powers.

When the power plant is designed to drive a marine screw, there is no difficulty in providing a reverse motion steam turbine $Tv$ AR according to known devices. During maneuvering of the ship, it is preferable that the compressor C runs at a relatively high velocity, so as to provide at once a sufficient available power for reverse motion, while the low pressure unit $Tg$ BP of the gas turbine is mechanically disconnected at A from the high pressure unit $Tg$ HP and is by-passed by opening a gate-valve O circulating the flue gas directly to the heater R. The unit $Tg$ BP of the gas turbine is driven light during reverse motion of the ship, this being of no inconvenience, as this machine has only a small number of expansion stages and relatively small sizes.

At low rates when the steam turbine is put out of circuit, the latter is driven idly by the gear-train. The boiler is then merely kept under pressure without an important output.

It is possible to show by calculation and by taking into account the amount of fuel liable to be burnt in the boiler, that, without altering the rate of the turbo-compressor unit or lowering by a large amount the total efficiency, the effective power may be varied in a ratio greater than 8 by acting merely by means of valve $V_1$ on the amount of fuel burnt inside the furnace $Ch$ of the boiler, if the efficiency of the gas turbine unit $Tg$ BP is independent of the total power; this is the case when the velocity of the driven member remains substantially constant. When it is not so (e. g. in the case of a marine screw), or when the ratio of the extreme powers must be greater than about 8.4, it is necessary to increase the rate of running of the compressor together with the required power, so as to increase simultaneously the output of air delivered and the useful amount of heat in the gas turbine. It is then enough to have a slight variation in the rate of running of the compressor in order to obtain a very wide range of available powers in the propulsion of ships.

As soon as the steam turbine is used, the relative importance of the effective power generated by the gas turbine rapidly decreases. If it is therefore necessary to resort to a compromise on the efficiency of the latter, this compromise must be established so that the gas turbine have its optimum adaptation at economic or cruising rate; its efficiency may be poor at any power.

Inversely, when high powers must only be achieved exceptionally (e. g. in the case of a warship), the steam engine may be treated as a peak plant with moderate efficiency and simplified accordingly (decrease of the vacuum at the condenser, reduction of the size of the condenser, of the last low pressure wheels of the turbine, reduction of the number of expansion stages and of the diameters of the pipes, etc. . . .).

At very low powers when only the gas turbine set is used, special known devices may be used, if need be, for effecting the reversing of motion without the help of the steam turbine, without reversible pitch blade screws and without a reverse motion gas turbine. Their technical achievement is possible in acceptable conditions since it is necessary to transmit low powers.

Figure 2:
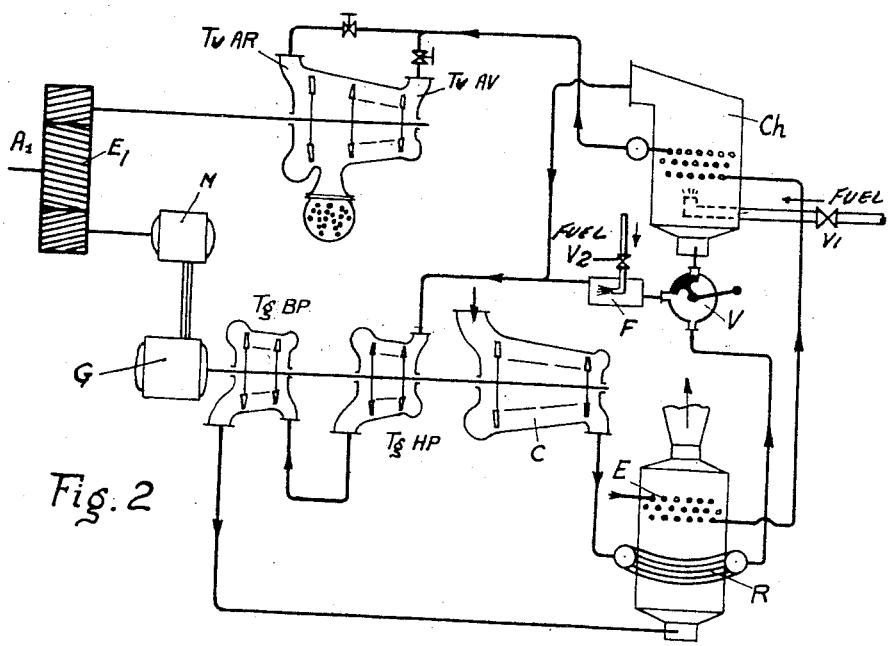

For example, Fig. 2 of the drawing shows an embodiment in which the gas turbine shaft is connected to the gear-train $E_1$ driving the shaft $A_1$ through an electric transmission comprising a generator G and a motor M. In order to drive in reverse motion the shaft $A_1$, by means of the gas turbines, it is sufficient to act, as known, on the connections between G and M for reversing the direction of rotation of M.

In such an embodiment, the by-pass O on the exhaust of the high pressure gas turbine $Tg$ HP becomes useless. Besides, both gas turbines $Tg$ BP and $Tg$ HP may be grouped in a single unit.

In another embodiment, with an arrangement similar to that of Fig. 1, the high pressure gas turbine $Tg$ HP and the compressor C have a direction of rotation opposite to that of the low pressure gas turbine $Tg$ BP. For forward motion, the coupling A between the two gas turbines, would then be declutched. On the other hand, for reverse motion, this clutch would be coupled and the low pressure turbine $Tg$ BP by-passed by opening the gate-valve O, so that the reverse motion driving of shaft $A_1$ is ensured by the high pressure gas turbine $Tg$ HP, the low pressure one being driven at no load in opposite direction to its direction when loaded.

The by-passing of the gas turbine $Tg$ BP increases the expansion inside the turbine $Tg$ HP which may then supply the required power.

When the previous arrangements for reversing the motion have been provided and when the ship is not required to develop rapidly a high power, it is no longer compulsory to keep the main boiler under pressure when the power plant runs at reduced rate.

Conversely, if the ship must be constantly in a state of emergency, it is necessary to keep a reduced pressure at the main steam turbine and to keep the auxiliaries of the steam engine in operation at a reduced speed, or ready to operate.

The electrical generator feeding the propulsion auxiliaries and the ship's requirements may be driven by the turbo-compressor whose speed varies little. The turbo-compressor may also control the feed-pump of the boiler $Ch$ or part of this pump. Such an arrangement is shown in Fig. 3 wherein $G_1$ is the electrical generator designed for the ship's requirements and P the feed-pump of the boiler $Ch$. It is also possible to conceive that the important auxiliaries (electric generators and feed-pump) be connected to a small independent gas turbine $T_1$ (Fig. 3a) whose motive gas would be tapped off just upstream with respect to the low pressure gas turbine with exhaust towards the heater R. When the gas unit alone supplies power, the consumption of energy of the auxiliaries may be kept at a sufficiently low value in order not to affect too far the cruising rate energy balance.

Even if the gas set is designed in such a way as to supply alone the whole range of reduced powers up to 1/3 or 1/4 of the maximum power, owing to a slight variation of its velocity, it will of course be possible to keep the steam plant in operation down to the lowest practical powers in anticipation of sudden operations or wide variations in rate, provided the velocity of the turbo-compressor unit is reduced accordingly.

Owing to the main use of a steam power plant for high loads, the invention allows a reduction in weight of the special refractory steels required for gas turbines. It allows also to profit for the major part of the unit, by the experience acquired in the construction of steam turbine plants and their auxiliaries. It also enables to do without costly engines such as high output air compressors.

The new plant has partly the suppleness and the cleanliness of the plants working in a closed fluid circuit (the circulating fluid being mainly steam for high loads) without the risks of large combustion chambers for heating the air and without the inertia and complexity of the devices which, in gas turbine plants working in a closed circuit, are required for varying the specific weight of the circulating gas at a point of the closed circuit. Lastly, it allows a reduction of the importance of the surfaces and joints submitted to high temperatures (ducts, stator and combustion chamber of gas turbines) which make difficult the problem of habitability in restricted premises as those of a warship or even a merchantman or a locomotive.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. In a power plant including a gas turbine set and a steam turbine set with a steam generator having a burner, both sets being adapted for the delivery of useful external power, the combination of an air compressor driven by at least one turbine of said gas turbine set, duct means from the delivery side of said compressor to the inlet of said gas turbine set, pipe means connected to said duct means and to the burner of said steam generator for supplying same with combustion air under pressure, a combustion chamber including adjustable means for the delivery of fuel and arranged on said duct means between the connection of same to said pipe means and the inlet of said gas turbine set for supplying said set with hot gas under pressure, adjustable control means for the delivery of fuel to the burner of said steam generator, and valve means on the connection of said pipe means to said duct means for controlling the parts of air under pressure flowing into said burner and into said combustion chamber, said valve means being adapted to allow cutting off the air under pressure of said burner.

2. In a power plant including a gas turbine set and a steam turbine set with a steam generator having a burner, both sets being adapted for the delivery of useful external power, the combination of an air compressor driven by at least one turbine of said gas turbine set, duct means from the delivery side of said compressor to the inlet of said gas turbine set, pipe means connected to said duct means and to the burner of said steam generator for supplying same with combustion air under pressure, a combustion chamber including adjustable means for the delivery of fuel and arranged on said duct means between the connection of same to said pipe means and the inlet of said gas turbine set for supplying said set with hot gas under pressure, further pipe means connecting the combustion gas outlet of said steam generator to a point of said duct means situated between said combustion chamber and the inlet of said gas turbine set for delivering the combustion gas of the burner of said steam generator into said gas turbine set, adjustable control means for the delivery of fuel to the burner of said steam generator, and valve means on the connection of said pipe means to said duct means for controlling the parts of air under pressure flowing into said burner and into said combustion chamber, said valve means being adapted to allow cutting off the air under pressure of said burner.

3. In a power plant including a gas turbine set and a steam turbine set with a steam generator having a burner and a feed water line, both sets being adapted for the delivery of useful external power, the combination of an air compressor driven by at least one turbine of said gas turbine set, duct means from the delivery side of said compressor to the inlet of said gas turbine set, pipe means connected to said duct means and to the burner of said steam generator for supplying same with combustion air under pressure, a combustion chamber including adjustable means for the delivery of fuel and arranged on said duct means between the connection of same to said pipe means and the inlet of said gas turbine set for supplying said set with hot gas under pressure, further pipe means connecting the combustion gas outlet of said steam generator to a point of said duct means lying between said combustion chamber and the inlet of said gas turbine set for delivering the combustion gas of the burner of said steam generator into said gas turbine set, adjustable control means for the delivery of fuel to the burner of said steam generator, valve means on the connection of said pipe means to said duct means for controlling the parts of air under pressure flowing into said burner and into said combustion chamber, said valve means being adapted to allow cutting off the air under pressure of said burner, and a heat exchanger connected to the outlet of said gas turbine set for recuperating the heat of the exhaust gas of same, and including heat exchange means arranged on the path of said duct means at the outlet of said compressor for heating the air under pressure delivered by said compressor and further heat exchange means arranged on the path of said feed water line for heating the feed water of said steam generator.

RAYMOND F. M. WAESELYNCK.

References Cited in the file of this patent

UNITED STATES PATENTS

| Number | Name | Date |
|---|---|---|
| 1,978,837 | Forsling | Oct. 30, 1934 |
| 2,055,385 | Noack | Sept. 22, 1936 |
| 2,110,422 | Norguet | Mar. 8, 1938 |
| 2,115,338 | Lysholm | Apr. 26, 1938 |
| 2,294,700 | Stroehlen | Sept. 1, 1942 |
| 2,401,285 | Woodward et al. | May 28, 1946 |
| 2,483,073 | Strub | Sept. 27, 1949 |

FOREIGN PATENTS

| Number | Country | Date |
|---|---|---|
| 602,573 | Great Britain | May 28, 1948 |